Patented Jan. 10, 1950

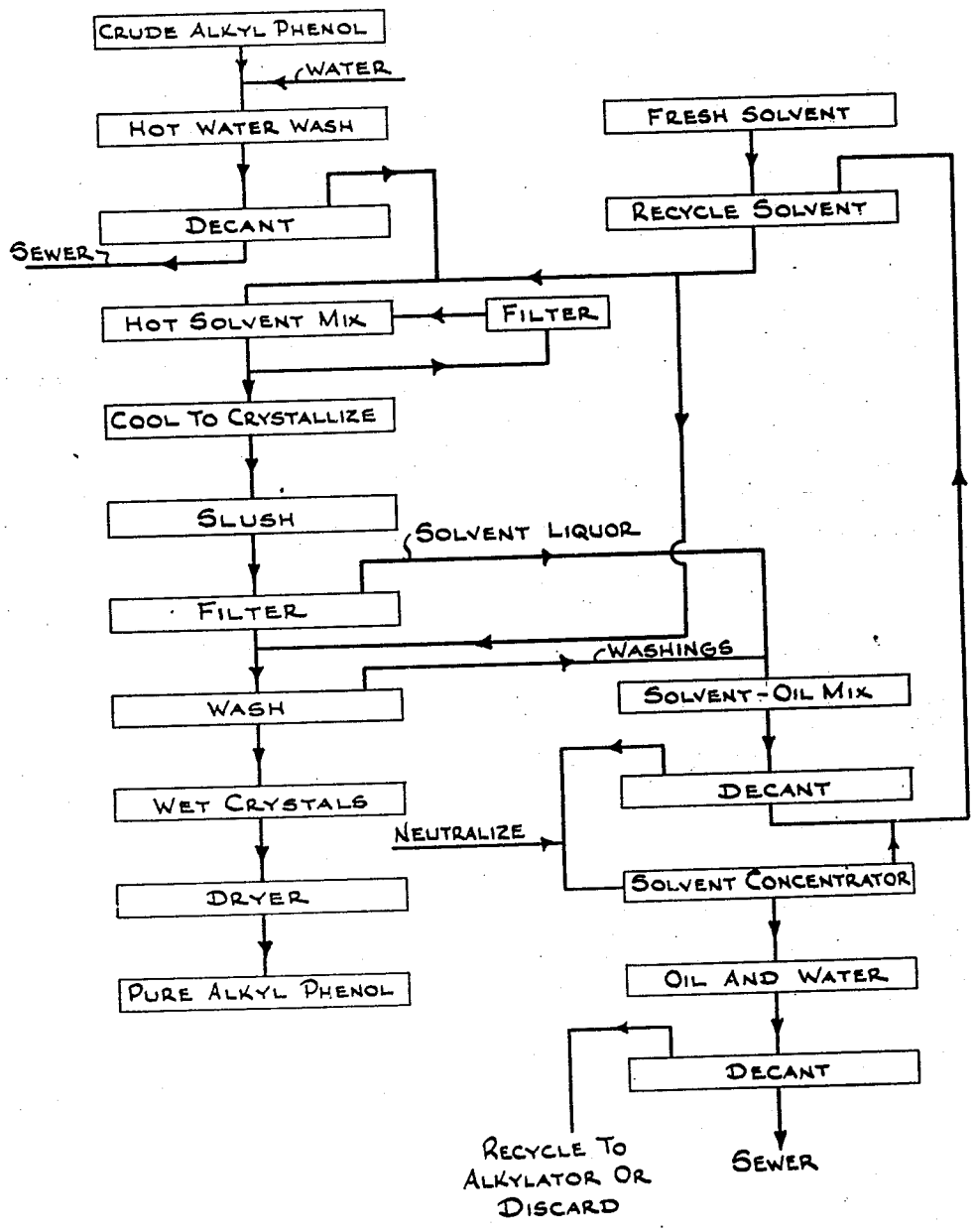

2,493,781

UNITED STATES PATENT OFFICE 2,493,781

PURIFICATION OF PHENOLS

Helmuth G. Schneider, Westfield, and Carll F. Van Gilder and Theodore J. Peters, Jr., Roselle, N. J., assignors to Standard Oil Development Company, a corporation of Delaware Application June 4, 1946, Serial No. 674,256

8 Claims. (Cl. 260—624)

This invention relates to the isolation and purification of crystalline alkylated phenols from crude mixtures and relates particularly to the purification of polyalkyl phenols, such as 4 methyl 2,6 di-tertiary butyl phenol.

Heretofore, it has been customary to isolate and purify such phenols by distillation, and particularly vacuum distillation. Such methods of purification require removal of residual catalyst from the crude phenols before subjecting them to heat, because of the extreme reversibility of the alkylation reaction at high temperatures. The crude alkyl phenols readily revert to phenol in presence of catalysts at high temperature. In order to remove the catalyst, sulfuric acid for instance, it is necessary to sumbit the crude product to extensive washing with caustic to hydrolyze the sulfuric acid-olefin and phenol complexes and frequently high temperature, pressure washing is required. Further, since the hydrolysis of these complexes is never quite complete, it is necessary to distill the crude in an alkaline condition which results in caustic buildup in the vacuum still with subsequent heat transfer loss, necessitating shut downs for clean outs, etc. Products resulting from distillation contain appreciable amounts of undesirable contaminants, such as other phenols and particularly mono alkyl phenols lower boiling than the desired pure compound, ranging from 3–10%, depending on efficiency of fractionation. They are further highly discolored in most cases, this discoloration being due to oxidation and polymeric products resulting from high temperatures and metallic surface contact.

The purpose of the present invention is to isolate a pure crystalline alkyl phenol constituent free of other alkylated phenols and color bodies from crude alkylate material using a solvent material (alcohol-water) which has limited solubility for the phenol in question, but maintains any contaminating material in solution in the upper layer of a two-phase system. A judicious choice of the alcohol quantity and strength is required to insure maximum recovery and purity of the product. That is, iso-propyl alcohol concentrations greater than 60% result in low recoveries because of increased solubility, below 60% result in oil contamination of the crystals, thereby lowering the purity. The proper adjustment of the phase equilibrium is required for optimum yields and purity. Most of the solvent is readily recovered from the oil layer by decantation and can be recycled in the system without further treatment.

Practical advantages of the present method are many:

(1) The majority (up to 80%) of the solvent can be recycled without any purification treatment;

(2) High yields are obtained;

(3) A simple atmospheric distillation with no reflux results in recovery of concentrated solvent;

(4) Oil recovered during the solvent distillation can be recycled after separation from the water to the alkylation unit without further treatment, and (5) The color of the resulting phenol is water white and substantially free of contaminating material.

In the annexed drawing is a general flow plan of the process.

Crude alkylated phenols are charged to a suitable vessel and washed with hot water to reduce the free acidity. After separation of the water layer, 60% by volume of isopropyl alcohol is added to decanted oil layer and the mixture is agitated hot. A two-phase liquid system results with the alcohol distributed between the bottom water layer and the top phenol layer. Any solid foreign material present at this stage is removed by a filter. The entire liquid phase is cooled until crystallization takes place.

By judicious control of the cooling rate and degree of agitation, any desired crystal size can be attained. For example, 5–7 hours cooling with 5–25 R. P. M. stirring gives crystals the size of sugar crytsals. The crystals are isolated from the slush by filtration or centrifuging and are washed with dilute solvent to remove adhering mother liquor. The crystals are dried to finished product.

The washings are combined with solvent liquor from the slush filter, and the solvent mixture is settled to give two layers. The bottom layer, after fortification with concentrated alcohol to 60%, is passed directly to recycle with no further purification. The top phenol-alcohol layer is neutralized with aqueous carbonate and sent to a still (solvent concentrator) in which alcohol is completely recovered and returned to recycle. The still residue, after separation from the aqueous layer, can be recycled back for further alkylation.

An example of the procedure follows:

55 pounds of melted crude alkylated phenol (2,6 di-tert. butyl, 4 methyl phenol) are charged to an open vessel equipped with a variable speed agitator and a steam and water coil. Ten to twenty gallons of hot water are added and the mixture agitated 15 minutes at 60°–70° C. After settling for 10–15 minutes, the water is drawn off the bottom and discarded. Another wash is desirable but not necessary. To the molten washed, crude alkylated phenol are added 16 gallons of 60% (vol.) isopropyl alcohol. The mixture is agitated at 50° C. minimum. At this point two phases are evident. After a very short period of mixing, water is turned into the coil to cool the mass to crystallize. The rate of agitation and rate of cooling can be adjusted to give any desired crystal size, from extremely fine up to ¼" or larger. Crystallization generally starts at 47-45° C. Cooling to this incipient crystallization can be rapid. After some crystal formation, cooling rate should be reduced to obtain the best yields. A preferred time is 5-24 hours. After the mixture has crystallized, the mass is sent through a continuous filter or centrifuge and the crystals isolated. The crystals are washed free of entrained liquor with fresh 60% alcohol (3-5 gallons) and dried to finished product. The original mother liquor, consisting of two phases, is combined with the wash liquors and the whole sent to a settler. The bottom alcohol layer (50% alcohol concentration) with some dissolved oil is fortified with fresh or recovered alcohol to 60% and recycled directly to the crystallizer with no further treatment. The top layer is sent to a still, sufficient carbonate added to neutralize free acidity, and the alcohol recovered by a simple distillation. Total alcohol recovery is possible, yielding 70% strength alcohol. The still residues, consisting of incompletely alkylated material and water are settled, the water layer discarded, and the phenols recycled back to the alkylation equipment. In this manner 95% of alkylated phenol is recoverable, based on p-cresol charged.

Other alcohols, such as methyl and ethyl, may be used in place of 60% isopropyl. The degree of dilution varies somewhat with the alcohol but the preferred ranges are 80% methly, 75% ethyl.

The above method of purification can be applied with modifications to the isolation of other crystalline phenols by proper adjustment of quantity and strength of solvent. Such phenols are p-tert. butyl phenol, and p-iso-octyl phenol. The alcohol strength must be adjusted to give the proper phase distribution, the preferred range in these cases being 30% to 40%.

We claim:

1. The method of isolating and purifying a crystalline alkylated phenol from an acidic crude mixture of the alkylated phenol wherein an acidic catalyst has been employed, which comprises washing the crude mixture with hot water, agitating the washed crude mixture with an aqueous alcohol solution in which the alkylated phenol has slight solubility so as to form two distinct liquid phases, cooling a resulting mass of said aqueous alcohol solution mixed with said washed crude mixture until the mass becomes a slush containing crystals of the alkylated phenol, separating said crystals from the slush, and thereafter washing and drying the separated crystals.

2. The method of isolating and purifying a crystalline alkylated phenol from other phenols in an acidic phenol alkylation product wherein an acidic catalyst has been employed, which comprises mixing said phenol alkylation product with an aqueous alcohol solution in controlled concentration that gives a two-phase liquid system of which one phase is composed of the alkylated phenol and some alcohol, crystallizing the alkylated phenol in the presence of the alcohol, and separating the crystallized alkylated phenol from the alcohol.

3. The method of isolating and purifying a crystalline alkylated phenol from an acidic phenol alkylation product wherein an acidic catalyst has been employed, which comprises admixing an alcohol and water with said product to form a two-phase liquid mixture, cooling said mixture to a slush containing crystals of the alkylated phenol, separating said crystals from the liquid portion of the slush, washing the crystals with alcohol and water, drying the washed crystals, separating from the liquid portion of the slush a phenol oil phase, neutralizing said phenol oil phase, distilling alcohol from said phenol oil phase, and separating phenol oil from water in remaining distillation residue of the phenol oil phase.

4. The method of isolating and purifying a crystalline alkylated phenol from an acidic phenol alkylation product wherein sulphuric acid was employed as a catalyst, which comprises mixing said phenol alkylation product with an aqueous alcohol solution in which the alkylated phenol has slight solubility so as to form two distinct liquid phases, separating from the resulting mixture crystals of the alkylated phenol, washing the separated crystals with some of the aqueous alcohol solution, and recovering most of said alcohol solution from liquid phases of said mixture by decantation.

5. The method of isolating and purifying crystalline polyalkyl phenol in an incompletely alkylated acidic phenol oil formed by a process wherein an acidic catalyst has been employed, which comprises adding to said phenol oil containing crystalline polyalkyl phenol in liquid state an alcohol diluted with sufficient water to form two liquid phases which settle into a top phenol oil layer and a bottom aqueous layer, the alcohol being in both layers, cooling said liquid phases until polyalkyl phenol crystals are deposited therefrom, separating the polyalkyl phenol crystals from said liquid phases for washing and drying, and separating incompletely alkylated phenol oil from alcohol and water of said liquid phases for further alkylation.

6. The method of isolating and purifying 4 methyl 2,6 di-tertiary butyl phenol from a crude alkylation mixture thereof, which comprises reducing free acidity of the mixture by washing with hot water, agitating the washed mixture with a portion of an aqueous isopropyl alcohol solvent of about 60 volume per cent strength in forming a two-phase liquid mixture therewith, cooling the resulting two-phase liquid mixture to a slush, filtering crystals from the slush, washing the crystals with another portion of said solvent, and drying the crystals.

7. A method as in claim 4 in which the crystalline alkylated phenol is 4 methyl 2,6 di-tertiary butyl phenol and the aqueous alcohol solution is an isopropyl alcohol solution.

8. A method as in claim 7 in which the aqueous isopropyl alcohol solution is in a concentration of approximately 60 volume % isopropyl alcohol.

HELMUTH G. SCHNEIDER.
CARLL F. VAN GILDER.
THEODORE J. PETERS, Jr.

REFERENCES CITED

The following references are of record in the file of this patent:

UNITED STATES PATENTS

| Number | Name | Date |
|---|---|---|
| 2,265,582 | Stevens et al. | Dec. 9, 1941 |
| 2,291,804 | Gump | Aug. 4, 1942 |
| 2,298,660 | Stevens | Oct. 13, 1942 |
| 2,370,554 | Luten et al. | Feb. 27, 1945 |
| 2,415,069 | Arvin et al. | Feb. 4, 1947 |